United States Patent
Jarchau et al.

(10) Patent No.: US 9,751,190 B2
(45) Date of Patent: Sep. 5, 2017

(54) FILTERS, SCREENS, SCREEN INSERTS, AND METHODS OF MAKING SAME

(71) Applicant: INFLOTEK B.V., Oegstgeest (NL)

(72) Inventors: Michael Jarchau, Oelde (DE); Paulus Antonius Jacobus Janitschek, Oelde (DE)

(73) Assignee: Inflotek B.V., Oegstgeest (NL)

( * ) Notice: Subject to any disclaimer, the term of this patent is extended or adjusted under 35 U.S.C. 154(b) by 41 days.

(21) Appl. No.: 14/948,717

(22) Filed: Nov. 23, 2015

(65) Prior Publication Data
US 2016/0074996 A1 Mar. 17, 2016

Related U.S. Application Data

(60) Division of application No. 13/804,025, filed on Mar. 14, 2013, which is a continuation of application No. PCT/IB2011/002732, filed on Sep. 16, 2011.

(30) Foreign Application Priority Data

Sep. 17, 2010 (EP) ..................................... 10177339

(51) Int. Cl.
*B24C 1/04* (2006.01)
*B01D 29/00* (2006.01)
(Continued)

(52) U.S. Cl.
CPC ........ *B24C 7/0015* (2013.01); *B01D 29/0093* (2013.01); *B01D 29/012* (2013.01); *B01D 29/03* (2013.01); *B24C 1/045* (2013.01)

(58) Field of Classification Search
CPC B01D 29/012; B01D 29/03; B01D 2201/184; B01D 39/10; B24C 1/045; B24C 7/0015
(Continued)

(56) References Cited

U.S. PATENT DOCUMENTS

| 4,600,622 A | 7/1986 | Carlson et al. |
| 4,951,429 A | 8/1990 | Hashish et al. |

(Continued)

FOREIGN PATENT DOCUMENTS

| AT | 383055 | 5/1987 |
| EP | 0050709 | 5/1982 |

(Continued)

OTHER PUBLICATIONS

International Preliminary Report on Patentability mailed Mar. 19, 2013, for International Application No. PCT/IB2011/002732, 6 pages.

(Continued)

*Primary Examiner* — Madeline Gonzalez
(74) *Attorney, Agent, or Firm* — Saul Ewing LLP (57) ABSTRACT

A method of making a filter or screen can include directed a high pressure cutting jet against a hard material at a plurality of positions to be cut that are separated by a portion of the material that is to remain uncut. Prior to moving from a first position to a second position, the abrasive can be replaced with a liquid or gaseous interference medium in such a way that reduces an energy density of the cutting jet from an energy density sufficient to remove or cut the material to an energy density insufficient to remove or cut the material. Once moved from the first position to the second position, the interference medium can be replaced with the abrasive in such a way that increases the energy density of the cutting jet from an energy density insufficient to remove the material to an energy density sufficient to remove the material.

14 Claims, 4 Drawing Sheets

(51) Int. Cl.
*B24C 7/00* (2006.01)
*B01D 29/01* (2006.01)
*B01D 29/03* (2006.01)

(58) Field of Classification Search
USPC .......... 210/497.3, 498, 499, 497.01; 451/38;
55/DIG. 5
See application file for complete search history.

(56) References Cited

U.S. PATENT DOCUMENTS

| | | | |
|---|---|---|---|
| 5,927,320 | A | 7/1999 | Pfarr et al. |
| 9,126,306 | B2 * | 9/2015 | Jarchau .................. B24C 1/045 |
| 2003/0037817 | A1 | 2/2003 | Rudy et al. |
| 2004/0129630 | A1 * | 7/2004 | Baker .................... B01D 29/03 |
| | | | 210/499 |
| 2010/0180738 | A1 | 7/2010 | Tavger |

FOREIGN PATENT DOCUMENTS

| | | |
|---|---|---|
| GB | 1395426 | 5/1975 |
| WO | WO91/12930 | 9/1991 |
| WO | WO93/07334 | 4/1993 |
| WO | WO00/56466 | 9/2000 |

OTHER PUBLICATIONS

International Search Report mailed May 4, 2012, for International Application No. PCT/IB2011/002732, 4 pages.

\* cited by examiner

FILTERS, SCREENS, SCREEN INSERTS, AND METHODS OF MAKING SAME

CROSS-REFERENCE TO RELATED APPLICATIONS

This application is a divisional of U.S. application Ser. No. 13/804,025, filed Mar. 14, 2013, which is a continuation of International Application No. PCT/IB2011/002732, filed Sep. 16, 2011, which claims priority to, and the benefit of, European patent application number EP 10177339.8, filed Sep. 17, 2010, the entire contents of each of which are fully incorporated herein by reference.

FIELD OF THE INVENTION

The present invention relates to filters, screens, screen inserts, and methods of making More particularly, the present invention relates to filters and screens having increased dimensional stability, as well as methods of their making that include formation by a cutting jet.

BACKGROUND OF THE INVENTION

Filters, screens, or screen inserts made of a dimensionally stable material, such as stainless steel plating, ceramic or another suitable, primarily hard material, are used in a variety of functional areas. Some specific examples include the separation of liquids and solids using various types of centrifuges, the drying of bulk solids using fluidized bed dryers, and the processing of sugar cane and sugar beet using sugar centrifugal. Filters, screens, or screen inserts for such processes are required to have attributes such as high overall open area, high mechanical stability, smooth surfaces, tapered openings, and high resistance to abrasion and other forms of wear.

In a known process for the production of a filter, screen, or screen insert, the cutting jet (usually a water jet filled with an abrasive) is guided so that strips remains between the two screen openings in the feed direction, whereby the feeding speed of the cutting head in accordance with the required strip length, which determines the distance between the two screen openings, is increased so that removal of the material is at least prevented enough so that the cutting jet does not penetrate the material.

This means that after cutting a screen opening, the cutting head is quickly accelerated for a brief period and then quickly slowed. The inertia imposed due to acceleration and braking has an extremely unfavourable effect on the stability of the cutting facility and on its oscillation characteristics, so that the requirements for optimised cutting quality are ultimately not achieved.

Of course, the feeding speed or acceleration must be viewed relatively, i.e. the cutting head can either be moved with a fixed blank or the blank with a fixed cutting head to insert the screen openings, whereby the fluid is guided through a nozzle positioned in the nozzle head under high pressure, such as about 3000 bar to about 4000 bar, as one example.

Another well-known configuration for the production of a screen insert makes use of switch valves to interrupt the cutting jet, in order to insert a hole or slit pattern in the blank, with which the supply of the pressurised fluid is interrupted in front of the cutting head or before entering the nozzle.

This naturally results in significant problems; especially with the respective switch frequency as required in the production of filigree patterns.

Due to the high pressure applied, the switch valve is subject to an exceptional load, so that the service life is very low. The resulting costs due to stoppage times to exchange the switch valve and procure it are an obstacle for optimised operations.

Above and beyond this, the quality of the screen openings has certain shortcomings because, with the known processes, especially when cutting slotted openings, the edges are shown to be frayed in the sense of a zigzag form.

With the high density of $5 \times 10^3$ to about $5 \times 10^5$ screen openings per square metre for certain applications, the relatively small width of the individual openings is reduced in some areas by the frayed edges which has a negative effect on the screening or filtering effect, because the defined outlet is practically not guaranteed.

WO 91/12930 A1 discloses a process for cutting materials with a cutting head in which the outlet channel flows into a fluid channel. However, the disclosed equipment that carries out the process is exclusively for applications at high environmental pressure, whereby, using the constant side supply of fluid during operation, abrasion to the outlet channel should be reduced and the jet shape of the cutting jet should be influenced. A functional interruption of the cutting jet is not possible with this construction.

This applies in the same way to equipment known from WO 2000/056466. In this case, the fluid jet supplied into the side of the outlet channel serves the exclusive purpose of changing the coherence of the cutting jet in order to be able to satisfactorily cut materials with different characteristics, and especially materials with different values of hardness.

Furthermore, the known technology teaches that merely stopping a supply of abrasive while maintaining high water pressure is ineffective and results in significant scoring of the target material being cut, even subsequent to stopping or "turning off the supply of the abrasive. Thus, such methods are strictly taught away from by the body of art, as they are considered to produce a filter, screen, or screen insert having a weakened structure, and are taught to reduce control by an individual operating the cutting jet over starting positions for cutting.

SUMMARY

Accordingly, there is a need for a process of efficiently operating of a cutting jet that involves little constructive work, as well as a process for making a filter, screen, or screen insert having an improved filtering or screening effect.

Embodiments of the present invention are directed to solutions to meet this and other needs, as well as having additional benefits that will be appreciated by one of skill in the art upon reading the present specification.

Certain embodiments of the present invention eliminate a requirement for switch valves to stop flow of the high-pressure fluid, thereby interrupting the cutting function of the cutting jet. Accordingly, in some embodiments, the high-pressure fluid is permanently applied in the supply line, such that the use of a plunger pump for producing pressure is possible in such embodiments without requiring additional, complex technology.

One surprising result is that by supplying an interference medium, the directed speed with which a cutting jet escapes from a cutting head (or the acceleration of any added abrasive) can be reduced in such a way that a cutting effect does not take place. Furthermore, it has been found by the present inventors that supplying such an interference medium produces no identifiable erosion in the affected area of a material at which the cutting jet is being directed.

When interrupting the interference jet (i.e., the cutting jet function), the immediate release of cutting energy takes place so that with a continual relative movement of the cutting head in the cutting direction, a relatively sharp edged opening can be created, thereby producing filters or screen inserts according to certain embodiments of the present invention.

The relatively sharp opposite edges of the opening can optimize filtering or screening effects, by being sized and shaped to only allow passage of particles corresponding with a particular desired maximum allocated size.

According to certain embodiments, an interference medium can be supplied or provided to the cutting jet. The interference medium can include a fluid or gaseous medium, such as water or air.

The supply of the interference medium can be computer-controlled, such as to produce a pattern. For example, a supply source of gaseous or fluid interference medium can be located downstream from a shut-off valve (e.g., a quick-switch valve). In some embodiments, the shut-off valve is controlled by one or more computers according to a first constraint that the shut-off valve is open whenever abrasive is not being supplied to the cutting jet, and according to a second constraint that the shut-off valve is closed whenever abrasive is being supplied to the cutting jet. In this manner, and as with other embodiments described herein, the interference medium and the abrasive can be supplied to the cutting jet in an alternating fashion.

Accordingly, certain embodiments of the present invention can provide one or more of the following features, during operation of the cutting jet: (a) either the abrasive or the interference medium is supplied to the cutting jet at all times of operation, (b) a high pressure fluid is continuously supplied to the cutting jet at all times of operation, and (c) the interference medium and the abrasive are never supplied to the cutting jet simultaneously during operation. In illustrative embodiments described further herein, each all of these features are provided.

In one embodiment, an abrasive to be added to a cutting jet escape from a nozzle of a cutting head, and the abrasive can take the form of a pourable substance (such as sand or another pourable substance). Alternatively, the abrasive can be in the form of a suspension, such as a mixture of sand and water. As yet a further alternative, the abrasive can include mineral particles that are sized and selected to minimize the distribution of the particle sizes thereof. Still other alternatives and different types of abrasives are possible and known in the art. All such alternatives and possibilities are contemplated within the scope of the present invention.

In the case of a functional interruption to the cutting jet, a prioritised valve-controlled shut-down of the abrasive supply can take place, whereby both switch processes (e.g., switching on and off of supplies of the abrasive and the interference medium) are activated in a synchronised manner, such that they are dependent on each other.

According to one embodiment, a method of making a filter or screen includes providing a high-pressure cutting jet that includes a continuous high-pressure fluid and an abrasive. The cutting jet can be directed against a hard material at a plurality of positions to be cut, wherein the plurality of positions to be cut includes at least a first position and a second position separated by a portion of the material that is to remain uncut. Prior to moving from the first position to the second position, the abrasive can be replaced with a liquid or gaseous interference medium in such a way that reduces an energy density of the cutting jet from an energy density sufficient to remove or cut the material to an energy density insufficient to remove or cut the material. The cutting jet can be moved from the first position to the second position. Upon reaching the second position, the liquid or gaseous interference medium can be replaced with the abrasive in such a way that increases the energy density of the cutting jet from an energy density insufficient to remove the material to an energy density sufficient to remove the material. Supply of the abrasive and of the liquid or gaseous interference medium can be synchronized and dependent on each other, such that supplying the liquid or gaseous interference medium to the cutting jet causes the abrasive to be interrupted and interrupting the liquid or gaseous interference medium causes the abrasive to be supplied to the cutting jet. Cuts made at the plurality of positions to be cut are tapering through openings, and wherein edges along the through openings are characterized by sharp edges.

According to further embodiments of the present invention, the filter or screen can include a screen insert. The cutting jet moving from the first position to the second position further can include moving the cutting jet, moving the material, and/or moving the cutting jet and the material relative to each other. The abrasive can include a pourable substance or a suspension. The abrasive can include sand or mineral particles selected to minimize particle size distribution. The cutting jet can operate at about 3000 bar to about 4000 bar. The supply of the abrasive and of the liquid or gaseous interference medium can be computer-controlled.

According to another embodiment of the present invention, a method of making a filter or screen can include producing a first opening in a hard material by directing a high pressure cutting jet against the material at one or more first positions where the first opening is to be formed. The high pressure cutting jet can include a continuous high pressure fluid and an abrasive. After producing the first opening, the abrasive can be replaced with a liquid or gaseous interference medium in such a way that reduces an energy density of the cutting jet from an energy density sufficient to remove or cut the material to an energy density insufficient to remove or cut the material. While the cutting jet possesses an energy density insufficient to remove or cut the material, the cutting jet can be moved to a second position on the material where at least a portion of a second opening is to be formed. The liquid or gaseous interference medium can be replaced with the abrasive in such a way that increases the energy density of the cutting jet from an energy density insufficient to remove the material to an energy density sufficient to remove the material, thereby producing at least a portion of a second opening in the material. Supply of the abrasive and of the liquid or gaseous interference medium can be synchronized and dependent on each other, such that supplying the liquid or gaseous interference medium to the cutting jet causes the abrasive to be interrupted and interrupting the liquid or gaseous interference medium causes the abrasive to be supplied to the cutting jet. Cuts made at least at the one or more first positions can be tapering through openings, and edges along the through openings are characterized by sharp edges.

According to further embodiments of the present invention, the filter or screen can include a screen insert. The cutting jet moving to a second position further can include moving the cutting jet, moving the material, and/or moving the cutting jet and the material relative to each other. The abrasive can include a pourable substance or a suspension. The abrasive can include sand or mineral particles selected to minimize particle size distribution. The cutting jet can operate at about 3000 bar to about 4000 bar. The supply of the abrasive and of the liquid or gaseous interference medium can be computer-controlled.

According to another embodiment of the present invention, a screen or filter can be made in accordance with a method that includes providing a high pressure cutting jet comprising a continuous high pressure fluid and an abrasive and directing the cutting jet against a hard material at a plurality of positions to be cut. The plurality of positions to be cut can include at least a first position and a second position separated by a portion of the material that is to remain uncut. Prior to moving from the first position to the second position, the abrasive can be replaced with a liquid or gaseous interference medium in such a way that reduces an energy density of the cutting jet from an energy density sufficient to remove or cut the material to an energy density insufficient to remove or cut the material. The cutting jet can move from the first position to the second position, and upon reaching the second position, the liquid or gaseous interference medium can be replaced with the abrasive in such a way that increases the energy density of the cutting jet from an energy density insufficient to remove the material to an energy density sufficient to remove the material. The supply of the abrasive and of the liquid or gaseous interference medium can be synchronized and dependent on each other, such that supplying the liquid or gaseous interference medium to the cutting jet causes the abrasive to be interrupted and interrupting the liquid or gaseous interference medium causes the abrasive to be supplied the cutting jet. Cuts made at the plurality of positions to be cut can be tapering through openings, and edges along the through openings can be characterized by sharp edges.

According to further embodiments of the present invention, the cutting jet can be used to form a plurality of additional openings.

According to yet another embodiment of the present invention, a screen or filter can include a plate comprising a hard, materially stable material. A plurality of slotted, tapered openings can be disposed in and at least partially through the hard, materially stable material of the plate. Each opening of the plurality of slotted, tapered openings ca have a substantially constant width distance between and for the length of continuous edges forming the opening.

According to yet further embodiments of the present invention, the screen or filter can be shaped as a cone basket, a cylinder, a flat sheet, or a plate. The screen or filter can include a filter insert. The hard, materially stable material of the plate can include a hard, materially stable metal.

BRIEF DESCRIPTION OF THE FIGURES

These and other characteristics of the present invention will be more fully understood by reference to the following detailed description in conjunction with the attached drawings, in which.

DETAILED DESCRIPTION

An illustrative embodiment of the present invention relates to a filter, screen, or screen insert having increased dimensional stability. In particular, the filter, screen, or screen insert can be formed of a hard material, such as a flat sheet metal plate. The filter, screen, or screen inserts can include a plurality of finely cut through-openings having sharp edges, e.g., that possess minimal burr. In the illustrative embodiment, the through-openings are slotted through-openings that are tapered in a through direction. In general, and given the improved dimensional stability, embodiments of the present invention can be formed into a wide variety of shapes, sizes and configurations. For instance, the filter, screen, or screen insert can be shaped as a cone basket, a cylinder, a flat sheet, a plate, and as yet other shapes.

Filters, screens, and screen inserts according to embodiments of the present invention are provided with greater dimensional stability over their usable lifetime. The feature of dimensional stability is exhibited as a consistency in dimensions of the filters, screens, or screen inserts, particularly in the dimensions of the openings included therein. Maximizing dimensional stability is an important characteristic for effective filtering or screening purposes, since the absolute and relative dimensions of a filter, screen, or screen insert are responsible for the filtering or screening effects of particularly sized particles. Thus, changes in these dimensions can result in ineffective screens that allow passage of particles, etc. intended to be blocked, and/or that deny passage of particles, etc. intended to be passed. In this manner, embodiments of the present invention possess improved overall lifetime, as well as greater consistency throughout their lifetime.

Further illustrative embodiments provide a method for making the improved filter, screen, or screen insert, which generally includes forming openings in a plate by directing a cutting jet at appropriate positions. Notably, the method involves supplying an interference medium and an abrasive in an alternating fashion to a high pressure fluid, in such a way that manipulates an energy density of a cutting jet and thereby controls the cutting properties of the cutting jet. While operating in a cutting mode, the cutting jet can be used to cut or remove material, and while operating in a non-cutting mode, the cutting jet can be redirected to different cutting positions without cutting intermediary material disposed therebetween. Notably, the illustrative method enables a high pressure fluid to be supplied continuously to form the cutting jet, both during a cutting operational mode and a non-cutting operational mode. Thus, the method provided herein eliminates requirements for starting and stopping the supply of the high pressure cutting jet, which presently constraints existing cutting jet methods of making filters, screens, and screen inserts and causes great amounts of strain on such manufacturing systems.

FIGS. 1 through 4, wherein like parts are designated by like reference numerals throughout, illustrate example embodiments of a screen insert and method of making, according to the present invention. Although the present invention will be described with reference to the example embodiments illustrated in the figures, it should be understood that many alternative forms can embody the present invention. For example, while described with reference to a high pressure fluid, one of skill in the art will appreciate that other pressure fluids may alternatively be used with embodiments of the present invention. Furthermore, while reference is made to particular illustrative shapes, orientations, and the like of filters, screens, screen inserts, and openings included therein, these examples are provided for purposes of illustration. In general, embodiments of the invention can encompass any particular length, shape, and orientation for optimizing any particular intended screening/filtering applications, as would be appreciated by one of skill in the art upon reading the present specification. One of skill in the art will additionally appreciate different ways to alter the parameters of the embodiments disclosed, such as the size, shape, or type of elements or materials, in a manner still in keeping with the spirit and scope of the present invention.

Figure 1:
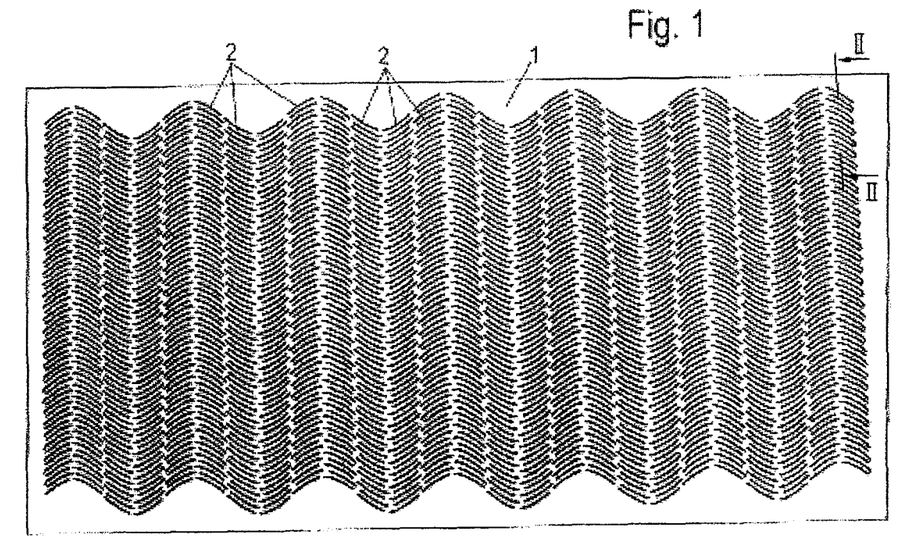
FIG. 1 depicts a top view of a filter insert produced in accordance with an example embodiment of the present invention.

FIG. 1 depicts a filter, screen, or screen insert, which can be made of a dimensionally stable material. The filter, screen, or screen insert includes a plate 1, which has a variety of slotted through-openings 2 that are separated from each other with strips.

In one illustrative embodiment, the dimensionally stable material is a flat sheet metal plate (or other plate) having a thickness of about 1 mm up to about 15 mm. In a further illustrative embodiment, the thickness is about 1 mm up to about 8 mm. The plate can be cut from a larger block of metal. A high pressure cutting jet can be directed against the plate at a plurality of different positions to create one or more openings (e.g., through openings) disposed therein, which collectively form a filter or screen shape suitable for screening or filtering applications and usages, as would be appreciated by one of skill in the art. This method of using a high pressure cutting jet, as described in further detail herein, can enable the filter, screen, or screen insert to be constructed from significantly harder materials. For example, high pressure cutting jets are capable of forming openings in hard metals, which are inaccessible to extrusion and other conventional processes for making filters, screens, and screen inserts. Constructing the filter, screen, or screen insert from a significantly harder material results in greater dimensional stability and durability than is characteristic of known filters, screens, and screen inserts.

In general, a wide variety of hard materials having a variety of hardness values can be used, including (as non-limiting examples) virtually any hard metal supplied in sheet form or any hard metal-based material supplied in sheet form. For example, one common and well-established scale for measuring metal hardness is the Rockwell C HRC scale. In general, the Rockwell scale is based on a material's "indentation hardness," as will be appreciated by one of skill in the art. Specifically, the Rockwell scale determines a hardness value for a material by measuring a depth of penetration of an indenter under a large load as compared to a depth of penetration made by a preload. In the Rockwell C HRC scale, the load can be about 150 kgf and the indenter can be a 120° diamond cone.

The Rockwell C HRC scale has a maximum hardness value of 72 HRC. Certain embodiments of the present invention provide filters, screens, and screening devices that are constructed from a material having the maximum Rockwell C HRC scale value of about 72 HRC. Furthermore, still other embodiments of the present invention provide filters, screens, and screening devices constructed from a material having hardness values greater than 72 HRC but which are not measurable by the Rockwell C HRC scale. By comparison, conventional wedge wires typically have a hardness value of 38 HRC or lower, or about 60 HRC if provided with a chrome coating, which tends to deteriorate and wear off during use.

Furthermore, such a method of making filters, screens, and screen inserts can be a "cold" process that adds very little heat to the plate, provided that a sufficient temperature of the cutting jet is utilized during formation of the one or more openings. Implementing embodiments as a cold process avoids certain drawbacks associated with application of heat to the plate. For example, laser treatment and other "hot" methods can result in reduced plate strength, increased likelihood of stress fractures of the plate, and melting of the plate at or around the cutting points, thereby producing undesirable jagged edges.

The through-openings 2 can be produced with a high pressure cutting jet that is ejected from a nozzle positioned in a cutting head (not depicted). The cutting functions of the cutting jet can be interrupted to allow for the formation of strips of material between through-openings 2 in the direction of feed and to similarly allow for the formation of multiple through-openings that are discontinuous, i.e., not connected to one another.

The cutting jet accordingly can operate at two different modes. In a first cutting mode, the cutting jet has an energy density sufficient to remove material to be cut. In a second non-cutting mode, the cutting jet has an energy density insufficient to remove material to be cut. In this manner, through-openings 2 can be formed when the cutting jet is in the first mode (i.e., has an energy density sufficient to remove material on the plate), and strips of material that remain between multiple discontinuous through-openings 2 can be formed by allowing the cutting jet to pass thereover while in the second mode (i.e., has an energy density insufficient to remove material).

In one illustrative embodiment, the cutting jet is continuously supplied by a high pressure fluid. The cutting jet is caused to be in the first mode and to have an energy density sufficient to remove material to be cut by additionally supplying an abrasive to the high pressure fluid to form the cutting jet. The cutting jet is caused to be in the second mode and can have an energy density insufficient to remove material to be cut by not supplying the abrasive to the high pressure fluid, and further by instead supplying an interference medium to the high pressure fluid to form the cutting jet. For instance, the interference medium can be a liquid or gaseous interference medium, or can be a solid interference medium (such as an interference pin). Accordingly, after being emitted from the nozzle and being directed onto the material when in the cutting mode, an interference medium can be added to the cutting jet and supply of the abrasive to the cutting jet can be halted. In this manner, the abrasive can be replaced by the interference medium. Likewise, supplies of the interference medium and the abrasive additionally can be controlled to enable the interference medium to be replaced by the abrasive, so as to configure or reconfigure the cutting jet in a cutting mode of operation. For example, in some embodiments, changes in the supplies of the abrasive and the interference medium can occur simultaneously. In other embodiments, introducing one of the supplies can initiate a gradual halting of the other supply.

In general, the interference medium can be supplied to the cutting jet at any suitable position, such as on a side of a central cutting channel in the cutting head leading to a jet outlet. As another example, the interference medium can be positioned to be introduced into the continuously supplied high pressure fluid downstream from where the continuously supplied high pressure fluid is introduced into the cutting head. The interference medium generally can include a fluid or gaseous medium, but may also be a solid, such as an interference pin inserted into the cutting jet.

Similar to the interference medium, and as described herein, the abrasive can be added to the high pressure fluid to increase the cutting effect, and can be introduced in a manner that depends on the interference medium supply. In one example embodiment, the two supplies of interference medium and abrasive can be mutually linked or made to be dependent upon one another through the use of one or more computer systems, e.g., one or more processors, non-transitory computer readable storage devices, and the like. For example, the interdependent supplies of abrasive and the interference medium can be controlled by one or more computing devices, and a "switch" or alternation between the two modes of operation (and thus between the two supplies) can be initiated by a user input action, e.g., a user pressing a button, clicking a mouse, controlling a joystick, typing into a keyboard, or any other form of providing an input signal to the one or more computing devices through an input device, e.g., logically coupled thereto.

Figure 2:
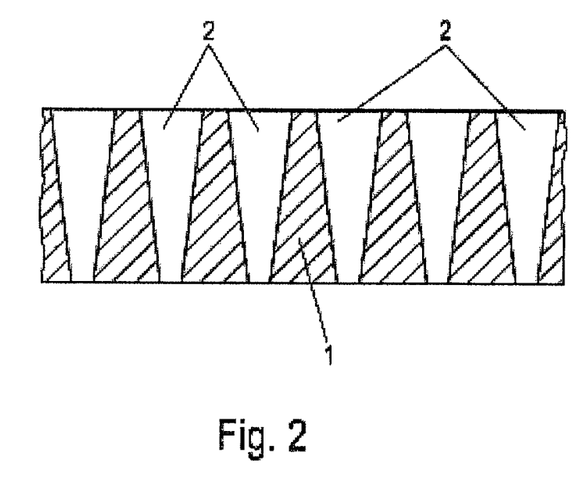
FIG. 2 depicts an enlarged cross-sectional view of the filter insert of FIG. 1 along line II-II, according to further aspects of the present invention.

As FIG. 2 clearly depicts, the through-openings 2 can taper in the through direction. The through-openings 2 can be made to have different length, pattern, orientation, depth, and other dimensional or physical characteristics. The internal walls of the through-openings 2 can be formed to be smooth by moving the cutting jet during cutting mode of operation at a slower speed. The through-openings can have sharp edge, e.g., that possesses minimal burr.

Figure 3:
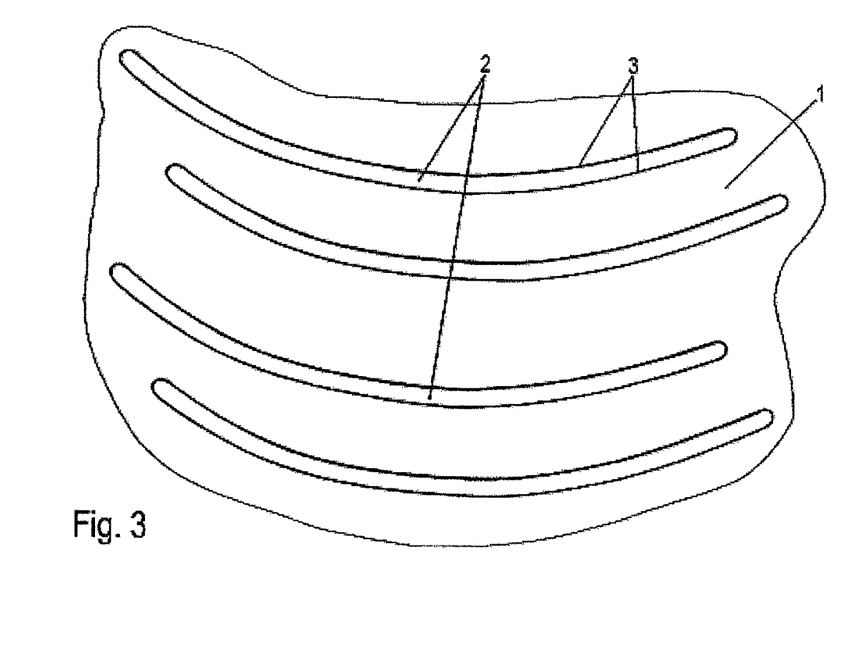
FIG. 3 depicts a top view of an enlarged section of the filter insert of FIG. 1, according to further aspects of the present invention.

In FIG. 3, several adjacent slotted through-openings 2 are depicted. Opposite edges 3 of the slotted through-openings 2 are relatively sharp, as depicted in FIG. 3, such that a largely even distance between the edges 3 along the through-openings 2 results in a longitudinal direction.

Figure 4:
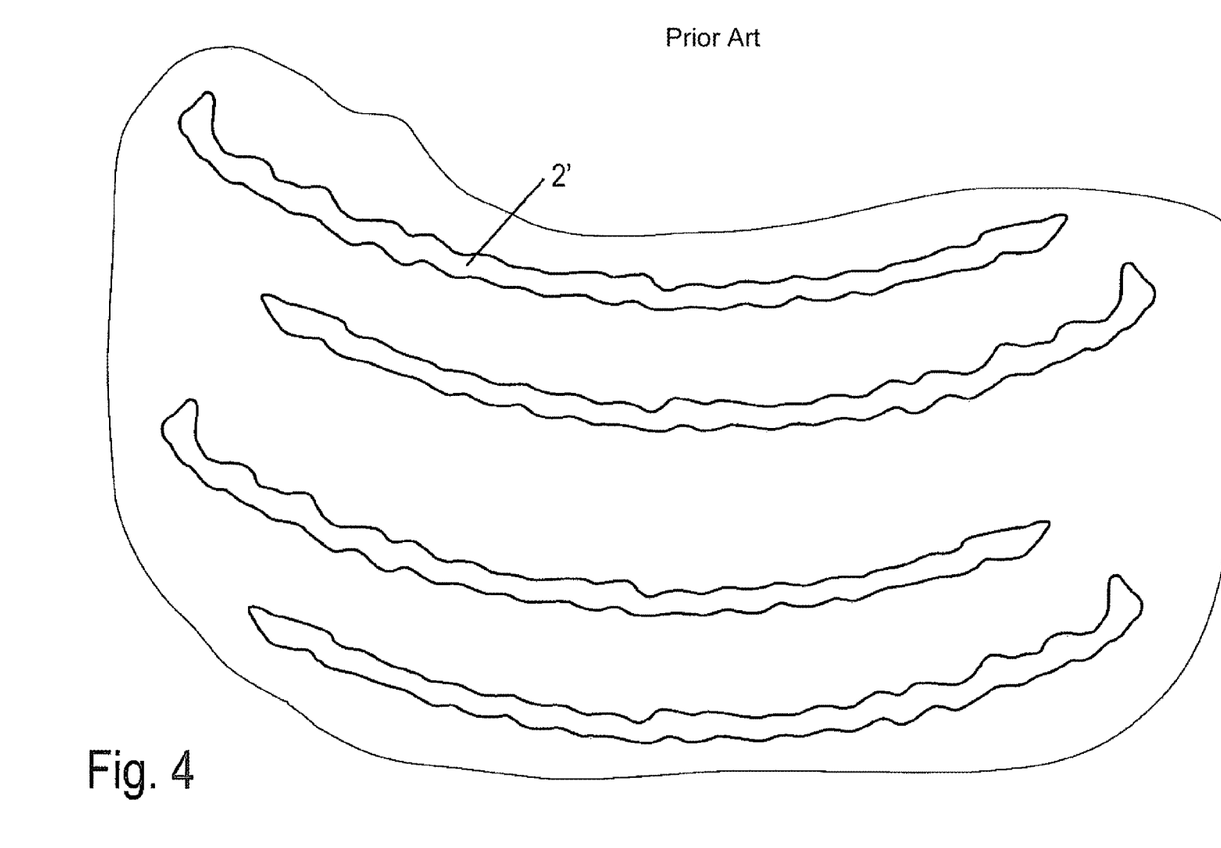
FIG. 4 depicts a top view of an enlarged prior art filter insert for purposes of comparison.

In order to illustrate the improved quality of the through-openings 2, the through-openings 2 of a prior art filter, screen, or screen insert are depicted in FIG. 4, which are formed therein using conventional technology. It is clear that the opposite edges of the prior art filter, screen, or screen insert of FIG. 4 are frayed in a zigzag shape such that, in relation to the length of the through-openings 2, there is a discontinuous distance between the edges. Illustrative embodiments of the present invention, as depicted in FIGS. 1 through 3, are capable of producing filters, screens, and screen inserts including a plurality of through-openings 2 characterized as having a substantially constant width or distance between opposing edges of the through-openings 2. Furthermore, certain embodiments of the present invention enable improved dimensional stability of the screens. This results in greater consistency of the through-openings 2 over their wear life, particularly when compared to wedge wire basket alternatives. In addition, the increased dimensional stability allows a broader range of screen shapes (e.g., cone baskets, cylinders, flat sheets, and the like) to be formed that have a higher tolerance (e.g., less runout, flatter surfaces, and the like) than traditional wedge wire screens.

Numerous modifications and alternative embodiments of the present invention will be apparent to those skilled in the art in view of the foregoing description.

Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method of making a filter or screen, comprising:
providing a high pressure cutting jet comprising a continuous high pressure fluid and an abrasive and directing the cutting jet against a hard material at a plurality of positions to be cut, wherein the plurality of positions to be cut includes at least a first position and a second position separated by a portion of the material that is to remain uncut;
prior to moving from the first position to the second position, replacing the abrasive with a liquid or gaseous interference medium in such a way that reduces an energy density of the cutting jet from an energy density sufficient to remove or cut the material to an energy density insufficient to remove or cut the material;
the cutting jet moving from the first position to the second position;
upon reaching the second position, replacing the liquid or gaseous interference medium with the abrasive in such a way that increases the energy density of the cutting jet from an energy density insufficient to remove the material to an energy density sufficient to remove the material;
wherein supply of the abrasive and of the liquid or gaseous interference medium are synchronized and dependent on each other, such that supplying the liquid or gaseous interference medium to the cutting jet causes the abrasive to be interrupted and interrupting the liquid or gaseous interference medium causes the abrasive to be supplied to the cutting jet; and
wherein cuts made at the plurality of positions to be cut are tapering through openings, and wherein edges along the through openings are characterized by sharp edges.

2. The method of claim 1, wherein the filter or screen comprises a screen insert.

3. The method of claim 1, wherein the cutting jet moving from the first position to the second position further comprises moving the cutting jet, moving the material, and/or moving the cutting jet and the material relative to each other.

4. The method of claim 1, wherein the abrasive comprises a pourable substance or a suspension.

5. The method of claim 1, wherein the abrasive comprises sand or mineral particles selected to minimize particle size distribution.

6. The method of claim 1, wherein the cutting jet operates at about 3000 bar to about 4000 bar.

7. The method of claim 1, wherein the supply of the abrasive and of the liquid or gaseous interference medium is computer-controlled.

8. A method of making a filter or screen, comprising:
producing a first opening in a hard material by directing a high pressure cutting jet against the material at one or more first positions where the first opening is to be formed, the high pressure cutting jet comprising a continuous high pressure fluid and an abrasive;
after producing the first opening, replacing the abrasive with a liquid or gaseous interference medium in such a way that reduces an energy density of the cutting jet from an energy density sufficient to remove or cut the material to an energy density insufficient to remove or cut the material;
while the cutting jet possesses the energy density insufficient to remove or cut the material, the cutting jet moving to a second position on the material where at least a portion of a second opening is to be formed;

replacing the liquid or gaseous interference medium with the abrasive in such a way that increases the energy density of the cutting jet from an energy density insufficient to remove the material to an energy density sufficient to remove the material, thereby producing at least a portion of a second opening in the material;

wherein supply of the abrasive and of the liquid or gaseous interference medium are synchronized and dependent on each other, such that supplying the liquid or gaseous interference medium to the cutting jet causes the abrasive to be interrupted and interrupting the liquid or gaseous interference medium causes the abrasive to be supplied to the cutting jet; and wherein cuts made at least at the one or more first positions are tapering through openings, and wherein edges along the through openings are characterized by sharp edges.

9. The method of claim 8, wherein the filter or screen comprises a screen insert.

10. The method of claim 8, wherein the cutting jet moving to a second position further comprises moving the cutting jet, moving the material, and/or moving the cutting jet and the material relative to each other.

11. The method of claim 8, wherein the abrasive comprises a pourable substance or a suspension.

12. The method of claim 8, wherein the abrasive comprises sand or mineral particles selected to minimize particle size distribution.

13. The method of claim 8, wherein the cutting jet operates at about 3000 bar to about 4000 bar.

14. The method of claim 8, wherein the supply of the abrasive and of the liquid or gaseous interference medium is computer-controlled.

* * * * *